United States Patent [19]

Bryndza et al.

[11] Patent Number: 5,143,873
[45] Date of Patent: Sep. 1, 1992

[54] PROCESS FOR ACTIVATION OR REGENERATION OF NICKEL CATALYST

[75] Inventors: Henry E. Bryndza, Avondale, Pa.; Albert L. Casalnuovo, Wilmington, Del.

[73] Assignee: E. I. Du Pont de Nemours and Company, Wilmington, Del.

[21] Appl. No.: 627,992

[22] Filed: Dec. 17, 1990

[51] Int. Cl.⁵ .................. B01J 31/40; B01J 31/12; B01J 38/50; C07C 253/00

[52] U.S. Cl. .......................... 502/33; 502/22; 502/29; 502/117; 502/162; 558/338

[58] Field of Search ............ 502/29.31, 162, 22, 502/33, 117; 558/338

[56] References Cited

U.S. PATENT DOCUMENTS

| | | | |
|---|---|---|---|
| 3,496,215 | 2/1970 | Drinkard et al. | 260/465.8 |
| 3,496,217 | 2/1970 | Drinkard, Jr. et al. | 558/338 |
| 3,496,218 | 2/1970 | Drinkard, Jr. et al. | 558/338 |
| 3,655,723 | 4/1972 | Drinkard et al. | 260/465.3 |
| 3,773,809 | 11/1973 | Walter et al. | 260/465.8 |
| 3,798,256 | 3/1974 | King et al. | 260/465.8 R |
| 3,859,327 | 1/1975 | Wells | 502/31 |
| 4,394,321 | 7/1983 | Cone | 260/439 R |
| 4,874,884 | 10/1989 | McKinney et al. | 558/338 |

Primary Examiner—Paul E. Konopka

[57] ABSTRACT

This invention concerns the use of $M[BR_3H]_y$ reagents for activating or regenerating deactivated or degraded Ni catalyst used in Ni-catalyzed alkene hydrocyanation processes in the presence of an organic phosphorus compound, where M is an electropositive ion excluding nickel, such as, but not limited to, the Group 1A cations, the Group IIA cations, the lanthanide cations and the quaternary ammoniums and R is an organic radical of up to 18 carbon atoms, and where y is equal to the net charge of the cation. The invention also concerns a process for activation or regeneration of Ni-catalysts using MH and a catalytic amount of $BR_3$.

35 Claims, No Drawings

PROCESS FOR ACTIVATION OR REGENERATION OF NICKEL CATALYST

BACKGROUND OF THE INVENTION

1. FIELD OF THE INVENTION

This invention concerns catalysts and methods for the activation or regeneration of catalysts for use in Ni-catalyzed hydrocyanation processes.

2. TECHNICAL REVIEW

U.S. Pat. Nos. 3,496,215, 3,496,217, 3,496,218, 3,655,723 and U.S. Pat. No. 3,798,256, which are incorporated herein by reference, describe alkene hydrocyanation in the presence of low valent, organophosphorus Ni complexes and, in some cases, Lewis acid promoters.

U.S. Pat. No. 4,394,321, which is incorporated herein by reference, discloses the preparation of $Ni(NCR)_4(N-CBAr_3)_2$ complexes, where Ar is an aryl radical, hereinafter referred to as NCBC's. In large-scale, $BAr_3$-promoted hydrocyanation processes, quantities of deactivated catalyst, primarily NCBC's and $Ni(CN)_2$, accumulate.

U.S. Pat. No. 3,859,327, which is incorporated herein by reference, describes the regeneration of active, zerovalent Ni catalyst by treating degraded catalyst with finely divided reducing metals and, optionally, a zinc halide promoter in a 60°–40° C. temperature range. Two disadvantages of this process are the relatively high temperatures required and the moderate yields of regenerated catalyst obtained (23–59%) in the absence of zinc halide promoter. While zinc halide promoters significantly improve the yield of regenerated catalyst, the zinc halide promoters are incompatible with $BAr_3$-promoted hydrocyanations because, as disclosed in U.S. Pat. No. 4,874,884, they have different inherent promoter characteristics and so represent potential new deleterious contaminants to the hydrocyanation process.

U.S. Pat. No. 3,655,723, cited above, describes the synthesis, but not the regeneration of Ni catalyst from $MBH_4$ and various Ni complexes including $Ni(CN)_2$. This procedure suffers from the inherent reactivity of byproduct boranes with alkenes, particularly pentenenitriles. This type of borane reactivity with alkenes is disclosed in U.S. Pat. No. 3,798,256 and is well documented by H. C. Brown in *Organic Synthesis Via Boranes*, John Wiley & Sons, New York, 1975. Again, these by-product boron compounds have different promoter characteristics than the $BAr_3$ promoters.

It is an object of the present invention to regenerate high yields of valuable Ni catalyst from degraded catalyst under mild conditions without the production of deleterious contaminants, using reagents that produce only byproducts which are compatible with $BR_3$ (R is an organic radical of up to 18 carbon atoms) promoted hydrocyanations.

SUMMARY OF THE INVENTION

This invention concerns an improved Ni-catalyzed alkene hydrocyanation process wherein $M[BR_3H]_y$ reagents are used to effectively regenerate zerovalent Ni catalyst from inactive nickel compounds, wherein inactive nickel compounds are degraded Ni hydrocyanation catalysts or divalent Ni compounds, preferably NCBC's or $Ni(CN)_2$; M is an electropositive ion excluding nickel such as, but not limited to the Group IA cations, Group IIA cations, the lanthanide cations and the quaternary ammoniums, most preferably $Li^+$ or $Na^+$, R is an organic radical having up to 18 carbon atoms, e.g. aryl or alkaryl, and y is equal to the net charge of the cation. Degraded Ni catalyst is treated with 2–6 equivalents of $M[BR_3H]Y$ for each equivalent of Ni in the presence of 4–10-equivalents of $P(OR')_3$ where R' is an organic radical with up to 18 carbon atoms, e.g. aryl or alkaryl, in an organic solvent at a 0°–80° C. temperature range.

This invention also concerns a process for regenerating or activating nickel hydrocyanation catalysts consisting of contacting an inactive nickel compound with a hydride compound of the formula $MH_y$, a catalytic amount of a boron compound of formula $BR_3$ and a phosphorus compound of the formula $P(OR')_3$ where M, R and R' are as defined above.

Regenerated Ni catalyst is obtained as zerovalent $Ni(P(OR')_3)_4$ in 80–100% yield and includes but is not limited to $MNCBR_3$, $BR_3$ and R'CN as coproducts of the reaction Pure NCBC's and $Ni(CN)_2$, primary components of the degraded Ni catalyst, are also readily converted to $Ni(P(OR')_3)_4$ under these conditions. This invention is useful for regenerating degraded Ni catalyst from both promoted and nonpromoted hydrocyanation reactions, but is particularly useful for $BR_3$-promoted hydrocyanations because the coproducts generated are already present in the hydrocyanation system.

DETAILED DESCRIPTION OF THE INVENTION

One embodiment of the reaction is carried out by adding a solution of $M[BR_3H]_y$, wherein M is an electropositive ion excluding nickel such as, but not limited to, the cations in Group IA, the cations in Group IIA, the lanthanide cations and quaternary ammoniums and wherein the Group IA cations are preferred, most preferably $Li^+$ or $Na^+$, y is equal to the net charge of the cation, to a solution or slurry of $P(OR')_3$ and the inactive nickel compound in an organic solvent and then stirring the reaction mixture for several hours. The yield of regenerated Ni catalyst, $Ni[P(OR')_3]_4$, is calculated from the relative $^{31}P$ NMR peak areas of $Ni[P(OR')_3]_4$ and $P(OR')_3$. The overall reaction is believed to require a minimum of two equivalents of $M[BR_3H]_y$ for each Ni. The solvents used in this form of the invention may be any organic solvents which are unreactive with the reagents employed, preferably organic nitriles or tetrahydrofuran (THF). The organic nitriles can be mono- or dinitriles and include 3-pentenenitrile, 4-pentenenitrile, adiponitrile, methylglutaronitrile and ethylsuccinonitrile. Of these, acetonitrile, 3-pentenenitrile and adiponitrile are preferred.

In a second embodiment of the reaction, $M[BR_3H]_y$ may be replaced with a catalytic amount of $BR_3$ and an excess of $MH_y$, preferably NaH, in a solvent that is unreactive with $MH_y$ and $BR_3$, preferably THF. Under these conditions the system is believed to produce $M[BR_3H]_y$ in situ.

The degraded Ni catalyst may be obtained from hydrocyanations carried out in the presence of the active Ni catalyst $Ni[P(OR')_3]_4$ where R, is an organic radical having up to 18 carbon atoms. Typical complexes of this type include $Ni[P(OC_6H_5)_3]_4$, $Ni[P(O-p-C_6H_4CH_3)_3]_4$, $Ni[P(O-m-C_6H_4CH_3)_3]_4$, and $Ni[P(O-m$ and $p-C_6H_4CH_3)_3]_4$. Optionally, a promoter may be added in these hydrocyanation reactions. Promoters useful for the hydrocyanation reaction have been defined in U.S. Pat. Nos. 3,496,217, 3,496,218, 3,859,327, and U.S. Pat. No. 4,874,884. Among these promoters, compounds of the type $BR_3$ are preferred for this invention. The amount of promoter used can generally be varied from about 1:16 to 50:1 mole ratio of promoter to catalyst.

NCBC's can be prepared as described in U.S. Pat. No. 4,394,321. In the examples that follow, ADN-NCBC refers to the NCBC derived from adiponitrile, specifically $Ni(NC(CH_2)_4CN)_2(NCBPh_3)_2$. Similarly, 3-PN-NCBC refers to the complex derived from 3-pentenenitrile, $Ni(NCCH_2CH=CHCH_3)$ 4 $(NCBPh_3)_2$.

Typical $P(OR')_3$ compounds which may be used in regenerating the active Ni catalyst include triphenylphosphite, tri(p-tolyl)phosphite, tri(m-tolyl)phosphite, and mixed tri(m- and p-tolyl)phosphite. The amount of $P(OR')_3$ used may vary from 4–10 equivalents per Ni in the degraded catalyst, but 6–8 equivalents are preferred.

$M[BR_3H]_y$ complexes, where M, R and y are as defined above, are most conveniently prepared according to the method described by H. C. Brown et. al. in *J. Am. Chem. Soc.* 1978, 100 (11), 3343–3349. Thus, an excess of MH is heated with $BR_3$ in an organic solvent compatible with both MH and $BR_3$, preferably THF. Excess MH is filtered from the reaction mixture and the resulting solution is used to regenerate Ni catalyst without further workup. $^{11}B$ NMR spectroscopic analysis of the $M[BR_3H]_y$ solution typically indicates complete conversion of $BR_3$ to $M[BR_3H]Y$. Alternatively, $LiBR_3H$ may be prepared from tbutyllithium and $BR_3$ according to the method described by H. C. Brown et. al. in *J. Organomet. Chem.* 1980, 188, 1–10. The amount of $M[BR_3H]_y$ used to regenerate Ni catalyst may vary from 2–6 equivalents per Ni in the inactive nickel compound, but 2–4 equivalents are preferred.

When MH and a catalytic amount of $BR_3$ are used to regenerate Ni catalyst, the amount of MH can vary from 2–10 equivalents per Ni; the amount of $BR_3$ can vary from 0.01 to 2.0 equivalents per Ni.

The process is carried out under an inert atmosphere such as $N_2$ or Argon; $N_2$ is preferred. Pressures can range from 0.05 to 100 atmospheres; atmospheric pressure is preferred. The temperature of the process can range from 0° to 80° C.; 10° C.–30° C. temperature is preferred. The reaction time depends on the reaction temperature. Generally, reactions are complete within 1–24 hours.

EXAMPLE 1

$LiBPh_3H$ (10.0 ml, 0.40 M in THF) was added to a roundbottom flask containing $Ni(CN)_2$ (0.111 g, 1.0 mmol) and $P(O-p-C_6H_4CH_3)$ (2.816 g, 8.0 mmol). The mixture was refluxed (67° C.) under a slow $N_2$ purge and then sampled for $^{31}P\{^1H\}$ NMR spectroscopic analysis after 24 hours. The yield of $Ni[P(O-p-C_6H_4CH_3)_3]_4$ by $^{31}P\{^1H\}$ NMR analysis was about 100%.

$LiBPh_3H$ (7.5 ml, 0.40 M in THF) was added to a roundbottom flask containing $Ni(CN)_2$ (0.111 g 1.0 mmol) and $P(O-p-C_6H_4CH_3)_3$ (2.816 g, 8.0 mmol) in 10 ml of $CH_3CN$. The mixture was refluxed under a slow $N_2$ purge and then sampled for $^{31}P\{^1H\}$ NMR spectroscopic analysis after 24 hours. The yield was about 86%.

EXAMPLE 3

$NaBPh_3H$ (0.750 ml, 0.40 M in THF) was added to a roundbottom flask containing ADN-NCBC (0.81 g, 0.1 mmol) and $P(O-p-C_6H_4CH_3)_3$ (0.290 g, 0.82 mmol) in 10 ml of $CH_3CN$. The reaction mixture was stirred at ambient temperature under a $N_2$ atmosphere. The reaction was sampled for $^{31}p\{^1H\}$ NMR spectroscopic analysis after 20 minutes and again after 2 days. After 2 days pure $Ni[P(O-p-C_6H_4CH_3)_3]_4$ had precipitated from solution as a white solid. The yield by $^{31}P\{^1H\}$ NMR was about 88% after 20 minutes and about 100% after 2 days.

EXAMPLE 4

NaH (0.024 g, 1.0 mmol) and $BPh_3$ (.005 g, 0.02 mmol) were added to a roundbottom flask containing ADN-NCBC (0.81 g, 0.1 mmol) and $P(O-p-C_6H_4CH_3)_3$ (0.211 g, 0.6 mmol) in 10 ml of THF. The reaction mixture was stirred at ambient temperature under a $N_2$ atmosphere and analyzed by $^{31}P(^1H)$ NMR spectroscopy after 3 hours and after 24 hours. The yield was about 47% and 54% after 3 and 24 hours, respectively.

EXAMPLE 5

$NaBPh_3H$ (0.750 ml, 0.40 M in THF) was added to a roundbottom flask containing ADN-NCBC (0.081 g, 0.1 mmol) and $P(O-p-C_6H_4CH_3)_3$ (0.211 g, 0.6 mmol) in 10 ml of 3-pentenenitrile. The reaction mixture was stirred at ambient temperature for two days and then analyzed by $^{31}P\{^1H\}$ NMR spectroscopy. The yield was about 80%.

EXAMPLE 6

$NaBPh_3H$ (3.75 ml, 0.40 M in THF) was added to a roundbottom flask containing degraded Ni catalyst (0.404 g, 7.52% Ni, 0.520 mmol Ni) and $P(O-p-C_6H_4CH_3)_3$ (1.412 g, 4.0 mmol) in 5 ml of acetonitrile. The reaction mixture was stirred at ambient temperature for 30 minutes and then analyzed by $^{31}P\{^1H\}$ NMR spectroscopy. The yield of $Ni[P(O-p-C_6H_4CH_3)_3]_4$ was about 95%.

EXAMPLE 7

NaH (0.120 g, 5 mmol) and $BPh_3$ (0.024 g, 0.1 mmol) were added to a roundbottom flask containing degraded Ni catalyst (0.405 g, 7.52% Ni, 0.520 mmol) and $P(O-m\&o-C_6H_4CH_3)_3$ 1.426 g, 4.05 mmol) in 10 ml of THF. The reaction mixture was refluxed under a $N_2$-atmosphere and analyzed by $^{31}P(^1H)$ NMR spectroscopy after about 24 hours. The yield of $Ni[P(O-m\&p-C_6H_4CH_3)_3]_4$ was about 66%.

EXAMPLE 8

$NaBPh_3H$ (1.95 ml, 0.40 M in THF) was added to a roundbottom flask containing degraded Ni catalyst (0.203 g, 7.52% Ni, 0.26 mmol Ni) and $P(O-p-C_6H_4CH_3)_3$ (0.732 g, 2.08 mmol) in 5 ml of 3-pentenenitrile. The reaction mixture was stirred at about 25° C. for 3 hours and then analyzed by $^{31}P(^1H)$ NMR spectroscopy. The yield of $Ni[P(O-p-C_6H_4CH_3)_3]_4$ was about 86%.

EXAMPLE 9

$NaBPh_3H$ (3.84 ml, 0.40 M in THF) was added to a roundbottom flask containing degraded Ni catalyst (0.203 g, 14.80% Ni, 0.512 mmol Ni) and $P(O-p-C_6H_4CH_3)_3$ (1.442 g, 4.0 mmol) in 5 ml of 3-pentenenitrile. The reaction mixture was stirred at about 25° C. for 4 days and then analyzed by $^{31}P(^1H)$ NMR spectroscopy. The yield of $Ni[P(O-p-C_6H_4CH_3)_3]_4$ was about 55%.

As many different embodiments of this invention may be made without departing from the spirit and scope thereof, it is to be understood that this invention is not limited to the specific embodiments exemplified except as defined by the appended claims.

What is claimed is:

1. A process for regenerating degraded nickel hydrocyanation catalysts consisting of contacting a degraded nickel compound with a borohydride compound of the formula $M(BR_3H)_y$ and a phosphorus compound of the formula $P(OR')_3$ under an inert atmosphere, wherein M is an electropositive ion excluding nickel, y is equal to the net charge of the electropositive ion, and R and R' aryl or alkyl of up to 8 carbon atoms, carried out within a temperature range of 0° C. to 80° C., in the presence of a solvent and wherein each equivalent of degraded Ni compound is treated with 2–6 equivalents of $M()Br_3H)_y$ and 4–10 equivalents of $P(OR')_3$.

2. The process of claim 1 wherein the inactive nickel compounds are NCBC's or $Ni(CN)_2$.

3. The process of claim 1 where the inactive nickel compounds are divalent nickel compounds.

4. The process of claim 1 where M is selected from the cations in Group IA, the cations in Group IIA, the lanthanide cations and quaternary ammoniums.

5. The process of claim 4 wherein M is $Li^+$ or $Na^+$.

6. The process of claim 1 conducted in an organic solvent.

7. The process of claim 6 wherein the solvent is selected from organic nitriles or THF.

8. The process of claim 7 wherein the organic nitrile is selected from 3-pentenenitrile, 4-pentenenitrile, adiponitrile, methylglutaronitrile and ethylsuccinonitrile.

9. The process of claim 1 conducted under pressure ranging from 0.05 to 100 atmospheres (about $5 \times 10^3$ to $10^7$ Pa).

10. The process of claim 1 wherein R is aryl or alkaryl.

11. The process of claim 1 where R' is aryl or alkaryl.

12. The process of claim 1 conducted under pressure ranging from 0.05 to 100 atmospheres (about $5 \times 10^3$ to $10^7$ Pa).

13. A process for activating nickel hydrocyanation catalysts consisting of contacting an inactive nickel compound with a borohydride compound of the formula $M(BR_3H)_y$ and a phosphorus compound of the formula $P(OR')_3$ under an inert atmosphere, wherein M is an electropositive ion excluding nickel, y is equal to the net charge of the electropositive ion, and R and R' are aryl or alkyl of up to 18 carbon atoms, carried out within a temperature range of 0° C. to 80° C., in the presence of a solvent and wherein each equivalent of inactive Ni compound is treated with 2–6 equivalents of $M(BR_3H)_y$ and 4–10 equivalents of $P(OR')_3$.

14. The process of claim 13 wherein a nickel hydrocyanation catalyst mixture of $Ni(P(OR')_3)_4$ and $BR_3$ is produced.

15. The process of claim 13 wherein the inactive nickel compounds are NCBC's or $Ni(CN)_2$.

16. The process of claim 13 wherein the inactive nickel compounds are divalent nickel compounds.

17. The process of claim 13 where M is selected from the cations in Group IA, the cations in Group IIA, the lanthanide cations and quaternary ammoniums.

18. The process of claim 17 wherein M is $Li^+$ or $Na^+$.

19. The process of claim 13 wherein each equivalent of inactive Ni compound is treated with 2–6 equivalents of $M[BR_3H]_y$ and 4–10 equivalents of $P(OR')_3$.

20. The process of claim 13 conducted in an organic solvent.

21. The process of claim 20 wherein the solvent is selected from organic nitriles or THF.

22. The process of claim 21 wherein the organic nitrile is selected from 3-pentenenitrile, 4-pentenenitrile, adiponitrile, methylglutaronitrile and ethylsuccinonitrile.

23. A process for regenerating or activating nickel hydrocyanation catalysts consisting of contacting an inactive nickel compound with a hydride compound of the formula $MH_y$, a boron compound of the formula $BR_3$, and a phosphorus compound of the formula $P(OR')_3$ under an inert atmosphere wherein M is an electropositive ion excluding nickel, and R and R' are aryl or alkyl having up to 18 carbon atoms, carried out within a temperature range of 0° C. to 80° C., in the presence of a solvent and wherein each equivalent of inactive nickel compound is treated with 2–10 equivalent of $MH_y$, 0.01 to 2.0 equivalents of $BR_3$, and 4–10 equivalents of $P(OR')_3$.

24. The process of claim 23 where the inactive nickel compounds are obtained from degraded nickel hydrocyanation catalysts.

25. The process of claim 23 where the inactive nickel compounds are NCBC's or $Ni(CN)_2$.

26. The process of claim 23 where the inactive nickel compounds are divalent nickel compounds.

27. The process of claim 23 where M is selected from the cations of Group IA, the cations of Group IIA and the lanthanide cations.

28. The process of claim 27 where M is $Li^+$ or $Na^+$.

29. The process of claim 23 conducted in an organic solvent.

30. The process of claim 29 wherein the solvent is selected from ethers, alkanes, alkenes and aromatic solvents.

31. The process of claim 30 wherein the solvent is selected from ethers.

32. The process of claim 31 wherein the solvent is selected from THF and diethyl ether.

33. The process of claim 23 wherein the pressure range is from 0.05 to 100 atmospheres ($5 \times 10^3$ to $10^7$ Pa).

34. The process of claim 23 wherein R is aryl or alkaryl.

35. The process of claim 23 wherein R' is aryl or alkaryl.

* * * * *

UNITED STATES PATENT AND TRADEMARK OFFICE
CERTIFICATE OF CORRECTION

PATENT NO. : 5,143,873

DATED : September 1, 1992

INVENTOR(S) : Bryndza et al.

It is certified that error appears in the above-identified patent and that said Letters Patent is hereby corrected as shown below:

At column 5, line 19, "$M()Br_3H)_y$" should be changed to

--$M(Br_3H)_y$--.

Signed and Sealed this

Twenty-third Day of November, 1993

Attest:

BRUCE LEHMAN

Attesting Officer     Commissioner of Patents and Trademarks